United States Patent [19]

Orlowski et al.

[11] Patent Number: 4,531,415
[45] Date of Patent: Jul. 30, 1985

[54] DIFFERENTIAL PRESSURE TRANSDUCER

[75] Inventors: Reiner U. Orlowski, Quickborn; Rolf U. D. Kobs, Tornesch; Manfred R. Liehr, Hamburg, all of Fed. Rep. of Germany

[73] Assignee: U.S. Philips Corporation, New York, N.Y.

[21] Appl. No.: 541,945

[22] Filed: Oct. 14, 1983

[30] Foreign Application Priority Data

Oct. 16, 1982 [DE] Fed. Rep. of Germany ....... 3238430

[51] Int. Cl.³ ............................................... G01L 9/12
[52] U.S. Cl. ........................................ 73/718; 361/283
[58] Field of Search ........................... 73/318; 361/283

[56] References Cited

U.S. PATENT DOCUMENTS

| 4,301,492 | 11/1981 | Paquin et al. | 73/718 |
| 4,398,194 | 8/1983 | Johnston | 73/718 |
| 4,458,537 | 7/1984 | Bell et al. | 73/718 |

Primary Examiner—Donald O. Woodiel
Attorney, Agent, or Firm—David R. Treacy

[57] ABSTRACT

A differential pressure transducer having a body of insulating material on which film electrodes are fixed, two diaphragms made of insulating material, and two film electrodes on the inner sides of the respective diaphragms facing the body. The diaphragms and the body together form cavities which are filled with an incompressible liquid, and the film electrodes of the body and of the diaphragms form capacitances which are dependent on the diaphragm deflection. The transducer is especially suitable for the measurement of the flow rate of explosive liquids or gasses.

2 Claims, 6 Drawing Figures

DIFFERENTIAL PRESSURE TRANSDUCER

BACKGROUND OF THE INVENTION

The invention relates to a differential pressure transducer consisting of a body of insulating material provided with film electrodes and of at least two electrically conductive diaphragms which form a capacitance in conjunction with each of the film electrodes, the capacitance being dependent on the diaphragm deflection. The film electrodes and diaphragms form closed, interconnected cavities which are filled with a liquid.

Such differential pressure transducers are used, for example, in flow measurement apparatus for determining the flow rate of a liquid through an aperture in a duct on the basis of the pressure drop measured on both sides of the aperture by means of a differential pressure transducer.

German Offenlegungsschrift 23 64 027 discloses a differential pressure transducer which consists of a metallic hollow cylinder with pressure measurement diaphragms welded to its faces. The hollow cylinder is filled with insulating material. The diaphragms enclose interconnected cavities which are filled with an incompressible liquid and form, in conjunction with fillm electrodes provided on the insulating material, capacitors whose capacitance depends on the pressure-induced diaphragm deflection. The diaphragms are made of metal and form part of an electrical circuit. The metallic diaphragms can carry an electrical potential, so that sparking between the diaphragms and grounded apparatus parts cannot be precluded. Therefore, the measurement of the flow rate of explosive liquids by means of the known differential pressure transducer involves the risk of explosions.

SUMMARY OF THE INVENTION

It is the object of the present invention to provide a differential pressure transducer which is also suitable for flow rate measurements of explosive liquids or gases.

This object is achieved in accordance with the invention in that the diaphragms are made of insulating material and are provided with film electrodes on their inner sides, which face the body. The outer side of the differential pressure transducer in accordance with the invention does not accommodate electrical leads capable of conducting electric voltages. In an embodiment in accordance with the invention, the insulating material is a ceramic material, preferably aluminum oxide ceramic. Ceramic, notably aluminum oxide ceramic, is highly resistant against chemically agressive liquids and gases, is not plastically deformable under pressure and has a high pressure and thermal loadability.

When the body and the diaphragms are interconnected by means of spacing rings of solder, the electrode spacing and hence the capacitance of the measurement capacitors can be adjusted by the choice of the thickness of the spacing rings.

When the body and/or the diaphragms are provided with supports on facing surfaces, the deflection of the diaphragms may be restricted to the permissible limit, thus preventing destruction of the diaphragms in the case of excessively large pressure differences.

Insulating supports also prevent short-circuits between the electrodes of the measurement capacitors.

Preferably, groove-like recesses which are connected to the filling duct are provided in the supports. In the case of an abrupt pressure variation, the liquid can thus be quickly distributed with the result that the response time of the transducer is substantially reduced.

Some embodiments in accordance with the invention and their operation will be described in detail hereinafter with reference to the accompanying diagrammatic drawings.

DESCRIPTION OF THE PREFERRED EMBODIMENTS

Figure 1:
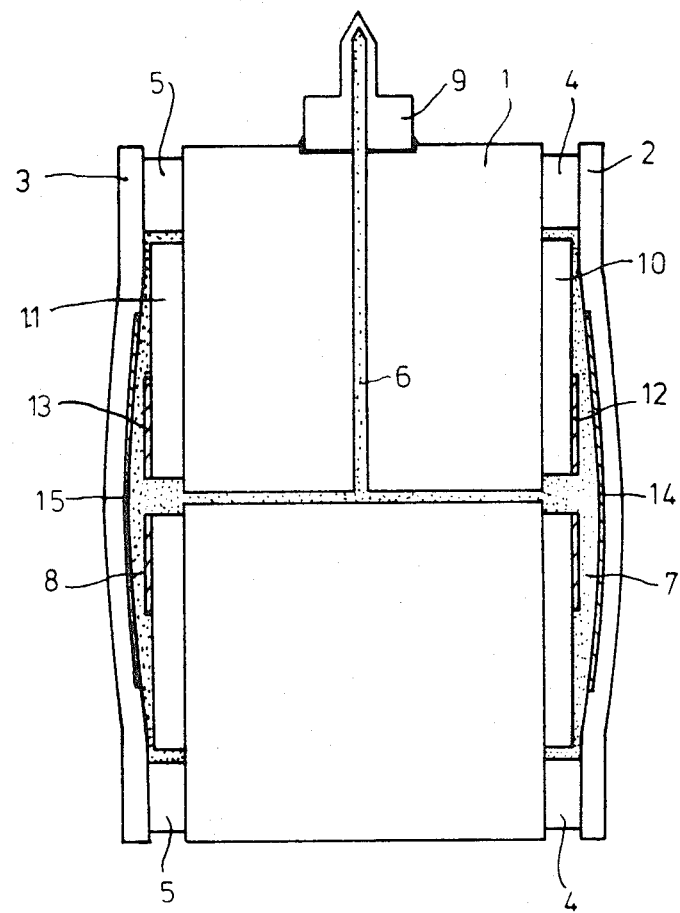
FIG. 1 is a sectional view of a differential pressure transducer according to the invention.

The differential pressure transducer which is shown in a sectional view in FIG. 1 consists of a cylindrical body 1; two elastic diaphragms 12 and 3 are connected to its end faces by means of glass solder spacing rings 4 and 5. The body 1 and the diaphragms 2 and 3 which are not conductively interconnected are made of the same material, such as an aluminum oxide ceramic, so that the body and the diaphragms 2 and 3 exhibit the same thermal behaviour. Temperature-induced measurement errors are thus avoided. The diaphragms 2 and 3, the spacing rings 4 and 5 and the end faces of the body 1 together form cavities 7 and 8 which are filled with an incompressible insulating liquid via a duct 6. The liquid may be, for example, silicon oil or a polymer of a trifluorovinylchloride. The duct 6 is closed by means of a cap 9.

Annular supports 10 and 11 are arranged on the body 1, and on the flat outer surfaces of the supports film-type electrodes 12 and 13 are fixed. The sides of the diaphragms 2 and 3 which face the body are provided with further film electrodes 14 and 15, respectively, which form in conjunction with the electrodes 12 and 13, respectively, capacitors whose capacitance depends on the deflection of the diaphragms 2 and 3. The spacing rings 4 and 5, the electrodes 12 and 15 and the supports 10 and 11 can be provided on the body 1 and the diaphragms 2 and 3, respectively, by thick-film techniques. The choice of the thickness of the spacing rings 4 and 5 enables adjustment of the distance between the electrodes 14, 25 and the electrodes 12, 13 and hence of the capacitance of the capacitors formed by the electrodes 12, 14 and 13, 15, respectively. The supports 10 and 11 have approximately the same thickness as the spacing rings 4 and 5.

The liquid of the differential pressure transducer is subject to an excess pressure which causes outward deflection of the diaphragms 2 and 3 as shown in exaggerated form in FIG. 1. The measurement range of the transducer equals, for example, double the excess pressure of the liquid filling.

When the diaphragm 3 is exposed to a pressure which exceeds that exerted on the diaphragm 2, the deflection of the diaphragm 3 decreases and the liquid which flows from the cavity 8 to the cavity 7 via the duct 6 increases the deflection of the diaphragm 2. This changes the two capacitances wherefrom the differential pressure acting on the diaphragms is determined.

The deflection and hence the bias of the diaphargms can be changed by changing the internal pressure. The measurement range of the differential pressure transducer follows from the bias of the diaphragms. The deflection provides mechanical biasing of the diaphragm, thus contributing to zero point stability and measuring accuracy.

Figure 2:
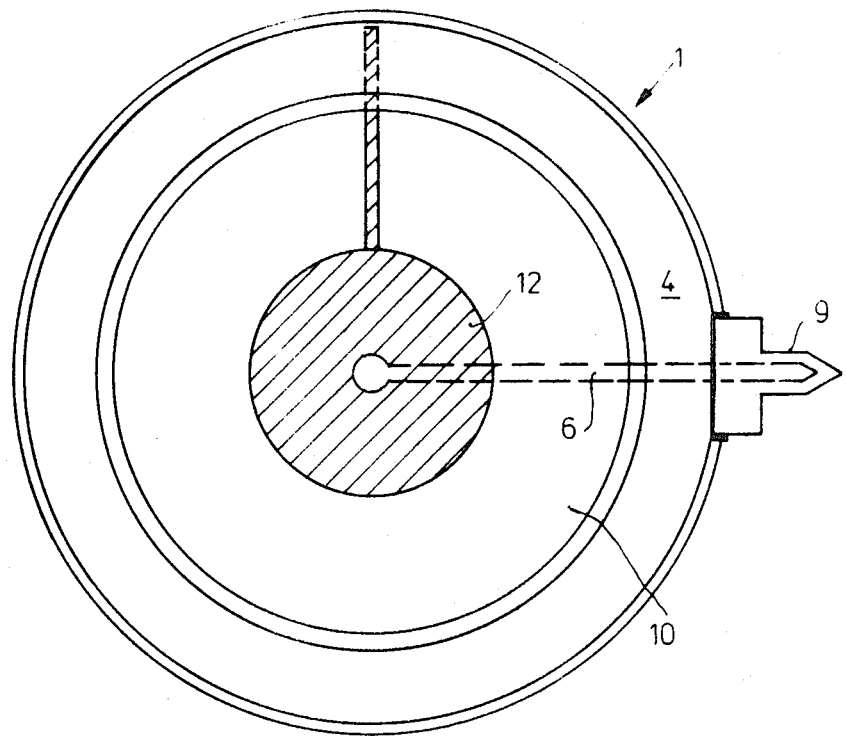
FIG. 2 is a sectional plan view of the body underneath the diaphragm.

FIG. 2 show the body 1 of the differential pressure transducer with the film electrode 12 provided on the support 10. The spacing ring 4 encloses the support 10. The filling duct 6 which is closed by the cap 9 is denoted by broken lines. The spacing ring 4 consists, for example, of an electrically non-conductive, glassy material such as a solder which is applied over the electrical connection tracks of the electrode 12.

Figure 3:
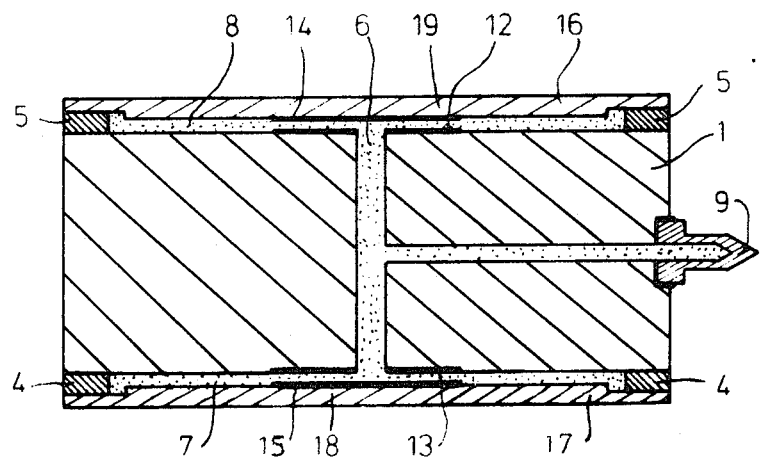
FIG. 3 is a sectional view of a second differential pressure transducer, whose diaphragms comprise supports.

FIG. 3 is a sectional view of a differential pressure transducer whose diaphragms 16 and 17 comprise supports 18 and 19 which are formed as platform-like raised portions on the sides of the diaphragms 16 and 17 which face the body 1. They are provided with film electrodes 14 and 15 and prevent destruction of the diaphragms 16 and 17 in the case of a unilateral excess pressure.

Figure 4:
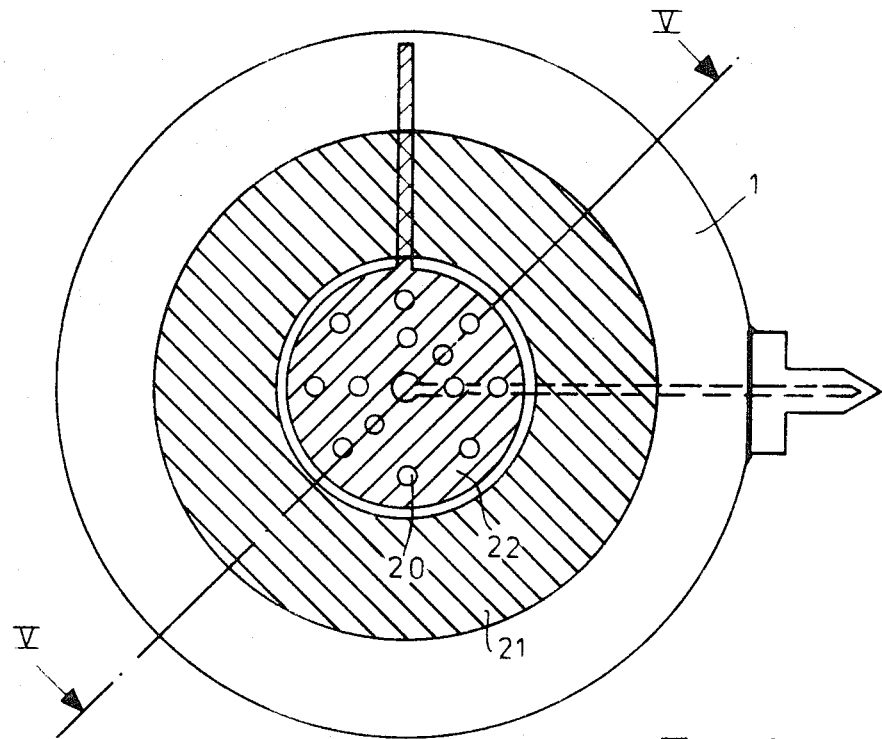
FIG. 4 is a sectional plan view of a third embodiment of the body, with insulating supports.
Figure 5:
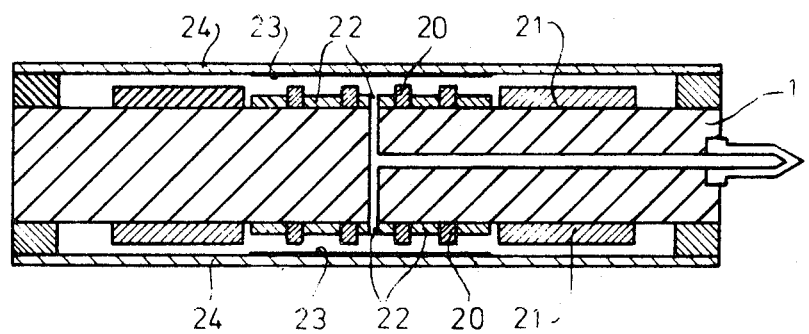
FIG. 5 is a sectional view taken along the line V—V in FIG. 4.

FIGS. 4 and 5 show an embodiment in which insulating supports 20 and 21 are provided on the body 1. The support 21 is constructed so as to be annular and encloses the electrode 22. The cylindrical projecting supports 20 are situated within the surface area covered by the electrode 22. The supports 20 and 21 are formed on the body 1 by the thick-film technique. However, they can alternatively be formed from the basic material of the body during its manufacture. The film electrodes may be thinner than the supports 20 and 21 so that when the diaphragms 24 are deflected, the electrodes 23 are supported by the supports 20 and 21 in order to prevent short-circuits between the electrodes 22 and 23. The support 21 may also be provided with groove-like recesses. However, it may alternatively be formed as cylindrical or other projections.

Figure 6:
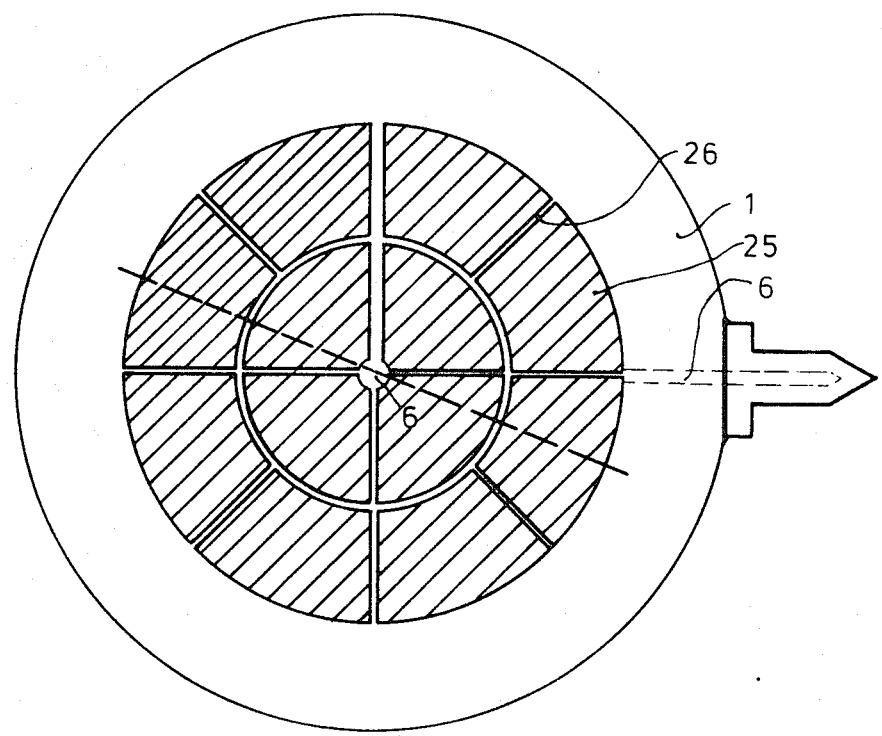
FIG. 6 is a sectional plan view off a fourth body, comprising a support with groove-like recesses.

FIG. 6 shows a body 1 with the support 25 which is deposited by the thick-film technique and which has groove-like recesses 26. The recesses 26 are connected to the filling duct 6 in order to ensure that the liquid filling can be readily distributed during filling or when the differential pressure acting on the diaphragms changes. The support 25 may also be formed as projections.

What is claimed is:

1. A differential pressure transducer comprising a body of insulating material; two film electrodes disposed on the body; two electrically conductive diaphragm electrodes each comprising an insulating diaphragm and a film electrode on a side of the diaphragm facing the body, arranged so as to form a capacitance in conjunction with respective film electrodes, said capacitance being dependent on the diaphragm deflection; and means for limiting relative movement of the diaphragm toward the body, said means comprising at least one support on a facing surface of at least one of said body and said diaphragms, extending toward the other of said body and said diaphragm; said body, film electrodes and diaphragm electrodes forming closed, interconnected cavities whiich are filled with a liquid,
characterized in that the body includes a filling duct, and the supports have groove-like recesses communicating with the filling duct.

2. A differential pressure transducer comprising a body of insulating material; two film electrodes disposed on the body; two electrically conductive diaphragm electrodes each comprising an insulating diaphragm formed from a ceramic material having the same composition as said body of insulating material, and a film electrode on an inner side of the diaphragm facing the body, whereby said body and said diaphragms have the same thermal behavior, said diaphragm film electrodes being arranged so as to form a capacitance in conjunction with respective film electrodes, said capacitance being dependent on the diaphragm deflection; and means for limiting relative movement of the diaphragm toward the body, said means comprising at least one support on a facing surface of at least one of said body and said diaphragms, extending toward the other of said body and said diaphragms; said body, film electrodes and diaphragm electrodes forming closed, interconnnected cavities which are filled with a liquid,
characterized in that said means comprises a plurality of said supports, said plurality including a plurality of projections formed of an insulating material and extending from said body through the film electrodes on the body.

* * * * *